United States Patent
Boedeker et al.

(10) Patent No.: US 9,688,061 B2
(45) Date of Patent: Jun. 27, 2017

(54) METHOD AND DEVICE HAVING A COUNTERPUNCHING BELT, FOR PUNCHING LABELS

(71) Applicant: GALLUS DRUCKMASCHINEN GMBH, Langgoens-Oberkleen (DE)

(72) Inventors: Andreas Boedeker, Langgoens (DE); Dieter Bangel, Huettenberg (DE)

(73) Assignee: Gallus Druckmaschinen AG, Langgoens-Oberkleen (DE)

( * ) Notice: Subject to any disclaimer, the term of this patent is extended or adjusted under 35 U.S.C. 154(b) by 119 days.

(21) Appl. No.: 14/490,726

(22) Filed: Sep. 19, 2014

(65) Prior Publication Data
US 2015/0075708 A1     Mar. 19, 2015

(30) Foreign Application Priority Data
Sep. 19, 2013   (DE) .......................... 10 2013 015 618

(51) Int. Cl.
*B32B 37/10*     (2006.01)
*B32B 38/04*     (2006.01)
(Continued)

(52) U.S. Cl.
CPC ................ *B32B 38/10* (2013.01); *B26D 7/20* (2013.01); *B31D 1/026* (2013.01); *B32B 37/02* (2013.01);
(Continued)

(58) Field of Classification Search
CPC ......... Y10T 156/1023; Y10T 156/1039; Y10T 156/1043; Y10T 156/1062; Y10T 156/1075; Y10T 156/1077; Y10T 156/1085; Y10T 156/1309; Y10T 156/1304; Y10T 156/1056; B32B 37/02; B32B 38/0004; B32B 38/10; B32B 43/006; B32B 37/1027; B32B 37/1036;
(Continued)

(56) References Cited

U.S. PATENT DOCUMENTS 3,539,414 A * 11/1970 Lefort ................... B65C 9/1819
                                                            156/364
3,574,026 A *  4/1971 Kucheck ................ B31D 1/021
                                                            156/152
(Continued)

FOREIGN PATENT DOCUMENTS

DE         9416809 U1     1/1995
DE         9321009 U1     8/1995
(Continued)

*Primary Examiner* — Linda L Gray
(74) *Attorney, Agent, or Firm* — Laurence A. Greenberg; Werner H. Stemer; Ralph E. Locher

(57) ABSTRACT

A device for punching labels from a substrate web having a carrier layer and a label layer includes a punching installation for punching labels. The punching installation has a delaminating installation for separating the label layer from the carrier layer, a metallic non-suction revolving counterpunching belt for conveying the label layer during a punching operation, and a relaminating installation for reconnecting the label layer, provided with punchings, to the carrier layer. A method for punching self-adhesive labels is also provided. In this way, a thin carrier layer can be used, and it is ensured that the carrier layer is not damaged during punching.

15 Claims, 4 Drawing Sheets

(51) Int. Cl.
  *B31D 1/02* (2006.01)
  *B26D 7/08* (2006.01)
  *B32B 38/10* (2006.01)
  *B32B 37/02* (2006.01)
  *B32B 38/00* (2006.01)
  *B32B 43/00* (2006.01)
  *B26D 7/20* (2006.01)
  *B26F 1/38* (2006.01)

(52) U.S. Cl.
  CPC ........ *B32B 38/0004* (2013.01); *B32B 43/006* (2013.01); *B26D 7/08* (2013.01); *B26F 1/384* (2013.01); *B32B 37/1036* (2013.01); *Y10T 156/1056* (2015.01); *Y10T 156/1085* (2015.01); *Y10T 156/12* (2015.01); *Y10T 156/1994* (2015.01)

(58) Field of Classification Search
  CPC .. B31D 1/026; B26D 7/20; B26D 7/08; B26F 1/384
  See application file for complete search history.

(56) References Cited

U.S. PATENT DOCUMENTS

| | | | |
|---|---|---|---|
| 4,214,378 A * | 7/1980 | Martin | F26B 3/20 156/304.1 |
| 5,399,228 A | 3/1995 | Schroeder et al. | |
| 5,674,345 A | 10/1997 | Nash | |
| 6,095,218 A | 8/2000 | Delmolino et al. | |
| 6,296,731 B1 | 10/2001 | Fujii et al. | |
| 6,592,693 B1 | 7/2003 | Nedblake | |
| 6,620,275 B1 * | 9/2003 | Avila | B31D 1/021 156/152 |
| 7,556,708 B2 | 7/2009 | Phillips et al. | |
| 2007/0261784 A1 | 11/2007 | Lawson | |
| 2011/0132522 A1 * | 6/2011 | Green | B26D 7/10 156/80 |
| 2011/0308713 A1 * | 12/2011 | Kroth | B65H 35/0013 156/238 |
| 2013/0340946 A1 * | 12/2013 | Frank | B65C 9/1869 156/540 |

FOREIGN PATENT DOCUMENTS

| | | |
|---|---|---|
| DE | 69711538 T2 | 10/2002 |
| DE | 10356037 A1 | 7/2005 |
| EP | 1055604 A1 | 11/2000 |
| EP | 1837170 A1 | 9/2007 |
| GB | 865165 A | 4/1961 |
| WO | 9903737 A1 | 1/1999 |
| WO | 0214069 A1 | 2/2002 |

\* cited by examiner

METHOD AND DEVICE HAVING A COUNTERPUNCHING BELT, FOR PUNCHING LABELS

CROSS-REFERENCE TO RELATED APPLICATION

This application claims the priority, under 35 U.S.C. §119, of German Patent Application DE 10 2013 015 618.1, filed Sep. 19, 2013; the prior application is herewith incorporated by reference in its entirety.

BACKGROUND OF THE INVENTION

Field of the Invention

The invention relates to a label punching device including an unwinding installation for providing, in particular, a printed substrate web having a carrier layer and a label layer, a label punching installation disposed downstream in a web-conveying direction, and a winding installation disposed downstream in the web-conveying direction, for receiving the substrate web. The invention also relates to a method for using a label punching device to punch self-adhesive labels from, in particular, a printed substrate web having a carrier layer and a label layer.

Devices for punching flat multi-layered products, having a punching cylinder and a counterpunching cylinder, are known. At least one layer of the flat multilayered product can be punched through in that case in a punching gap formed by the punching cylinder and the counterpunching cylinder, without all of the layers being completely severed and with the width of the punching gap being adjustable.

In this description, the term "punching" is used in the more concise sense, implying "severing," "perforating" or "piercing," on one hand, and also in the wider sense, meaning "embossing," i.e. "deforming" or "impressing," on the other hand. The same applies to similar grammatical constructions, such as, for example, "punchable" which, in the more concise sense, is understood to be "severable," "perforable" or "pierceable," and in the wider sense to be "embossable," "deformable" or "impressible." It is only for the purpose of simplifying the description, but without limiting the mentioned connotations, that the term "punching" and similar grammatical constructions are used. In the following, the terms "punch," "punching device" and "punching machine" are also used synonymously.

When punching flat multilayered product such as self-adhesive labels, for example, in particular in a device for punching in a printing machine, an upper material, a substrate material lying on top (the actual label material which, in the following, is referred to as the label layer), and an adhesive layer have to be punched through (in particular severed), without damaging, in particular severing, an underlying carrier material (referred to as the carrier layer in the following). The flat multilayered product may, in particular, be web-shaped.

The punching operation depends on the material, and therefore a modification or adjustment of the device, for example, of the positions of the components of the device or of the punching force, has to take place in such a manner that the punching depth can be modified in a range of a few micrometers up to a few tenths of a millimeter. Punching typically takes place in a so-called rotary punching unit or a rotary embossing unit. In this case, in a punching gap formed between a punching cylinder, which carries a punching die or an embossing die, and a counterpunching cylinder, the punching die or the embossing die acts on the flat multilayered product which undergoes a plastic modification in the form of a severing or of an embossing. Non-contacting laser punching installations are also known as alternatives to those presently described mechanical punching installations.

For cost reasons and for reasons of environmental protection there are presently efforts aimed at managing with as thin a carrier layer as possible. The risk of the carrier layer also being damaged when punching the labels from the label layer is significantly higher when the substrate web is processed through the punching installations described above. In the worst case, the carrier layer may tear and cause a machine stoppage. In order to address that problem, installations are known which, prior to the punching process, separate the label layer from the carrier layer, in such a way that the carrier layer cannot be damaged during punching. U.S. Pat. No. 3,574,026 discloses such an installation in which a substrate web is separated prior to the punching unit which is implemented as a rotating punching cylinder. While the carrier layer is deflected around the punching unit, the label layer passes through the punching tools. During conveying of the label layer through the punching tools the label layer is guided by suction-type conveyor belts that make contact with the upper side of the label layer. Once the punching process has been completed, the label layer and the carrier layer are relaminated together again. A similar installation is described in EP 1 055 604 A1. A rotating suction roller is used in that case instead of the revolving suction belts.

It is disadvantageous in those installations that, on one hand, the label layer, with its side provided with an adhesive, may adhere to the punching tools, potentially resulting in contamination of the punching tools and, consequently, in deterioration of quality in the punching process. On the other hand, conveying the label layer over suction belts and/or suction rollers is shown to be complex and the consumption of suction air is considered to be bothersome.

SUMMARY OF THE INVENTION

It is accordingly an object of the invention to provide a device for punching labels and a method for punching self-adhesive labels, which overcome the hereinafore-mentioned disadvantages of the heretofore-known devices and methods of this general type, in which a thin carrier layer may be used and in which it is ensured that the carrier layer is not damaged during punching and a requirement for suction air for conveying the label layer may be dispensed with.

With the foregoing and other objects in view there is provided, in accordance with the invention, a device for punching labels, comprising an unwinding installation for providing an, in particular, printed substrate web having a carrier layer, a so-called liner, and a label layer, a so-called face stock, which together form a self-adhesive substrate assembly. The device for punching, when seen in the web-conveying direction, furthermore has a downstream punching installation for punching labels from the label layer of the substrate web and, when seen in the web-conveying direction, a downstream winding installation for receiving the substrate web. According to the invention, the punching installation has the following: a delaminating installation for separating the label layer from the carrier layer, a metallic non-suction revolving counterpunching belt, disposed farther downstream, in the form of an endless belt for conveying the label layer during the punching operation, wherein the label layer, on its adhesive side, is temporarily connected to the counterpunching belt, and a relaminating installation, disposed farther downstream, for reconnecting the label layer, provided with punchings, to the original carrier layer. Due to the metallic counterpunching belt, secure conveying of the label layer during the punching process and precise punching of the labels are ensured in an advantageous manner. It is also advantageous that the punching tools do not act on the label layer from the adhesive side but from the face side of the label layer.

In accordance with another particularly advantageous feature of the device for punching labels of the invention, conveying rollers are disposed parallel to the punching installation for conveying the carrier layer during the punching operation.

In accordance with a further advantageous feature of the device for punching labels of the invention, the delaminating installation is implemented as a delaminating roller and/or the relaminating installation is implemented as a laminating roller.

In accordance with an added particularly advantageous first feature of the device for punching labels of the invention, the punching installation is configured in such a manner that the revolving counterpunching belt is assigned a punching cylinder for punching the labels from the label layer. A counter roller may also be disposed opposite the punching cylinder, below the counterpunching belt, wherein the counter roller may be provided with a rubber coating. Additionally, the counterpunching belt may also be provided with an elastic layer on its lower surface. Both the rubber coating and the elastic layer, due to their damping properties, contribute toward significantly reduced wear of the punching tool of the punching cylinder.

In accordance with an additional particularly advantageous second feature of the device for punching labels of the invention, the punching installation is implemented in such a manner that the revolving counterpunching belt is assigned a laser punching unit for punching the labels from the label layer.

In accordance with yet another particularly advantageous feature of the device for punching labels of the invention, the counterpunching belt has a special coating, in particular a non-stick coating. Due to this coating, it is advantageously possible for the label layer to be readily peeled off again from the counterpunching belt after the punching process has been completed.

In accordance with yet a further advantageous feature of the device for punching labels of the invention, the device for punching has a matrix stripping installation which is configured, in particular, as a matrix stripping roller and which may be disposed upstream or downstream of the relaminating installation.

In accordance with yet an added advantageous feature of the device for punching labels of the invention, the tension of the revolving counterpunching belt can be varied. In this way, slight adjustability of the cutting force is achieved when using mechanical punching tools.

With the objects of the invention in view, there is also provided a method for punching self-adhesive labels, in particular by using a device as described above, from an, in particular, printed substrate web having a carrier layer and a label layer. In a first step, the label layer is separated from the carrier layer, which is referred to as delaminating. In a second step, the label layer, with its adhesive side, is applied onto a revolving, endless, non-suction counterpunching belt, and punching of the labels takes place. In the meantime, the carrier layer is separately conveyed onward. Subsequently, the label layer, provided with punchings, is connected again to the original carrier layer, which is referred to as relaminating, and the substrate web can be conveyed onward.

In accordance with a concomitant advantageous mode of the method of the invention, the matrix surrounding the labels, either after punching of the labels or after reconnection of the label layer to the carrier layer, is removed as part of the label layer. The labels are thus available on the carrier layer for further processing, for example for applying to products, while the matrix can be disposed of as waste.

The described invention and the described advantageous refinements of the invention also represent advantageous refinements of the invention when they are combined with one another.

With respect to further advantages and to embodiments of the invention which are constructively and functionally advantageous, reference is made to the dependent claims and to the description of exemplary embodiments with reference to the attached figures.

Other features which are considered as characteristic for the invention are set forth in the appended claims.

Although the invention is illustrated and described herein as embodied in a method and a device having a counterpunching belt, for punching labels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
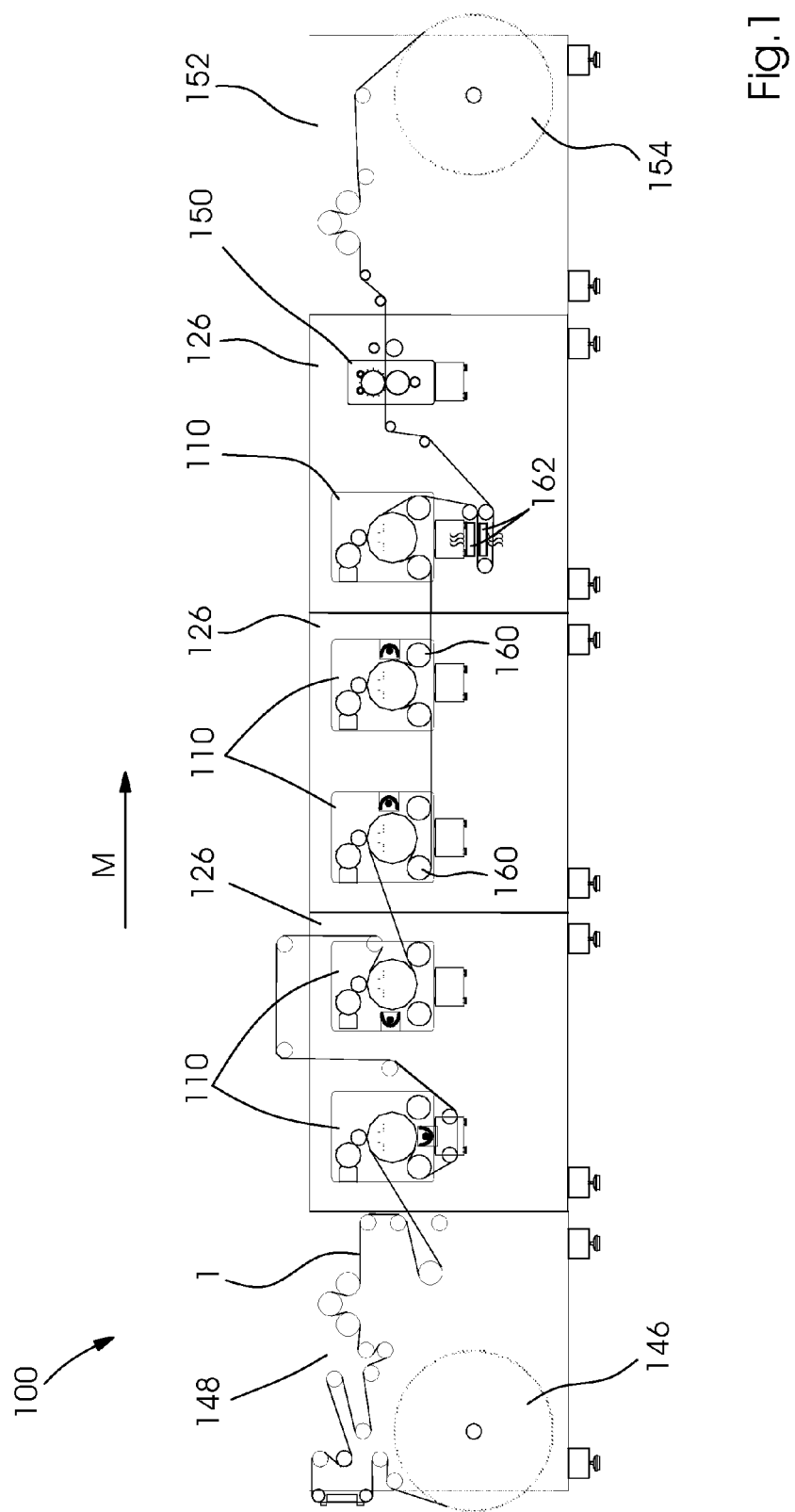
FIG. 1 is a diagrammatic, longitudinal-sectional view of a label printing machine having a device for punching labels, according to the invention.

Referring now to the figures of the drawings in detail and first, particularly, to FIG. 1 thereof, there is seen a preferred embodiment of a printing machine 100, more specifically of a narrow-web label printing machine in sequential construction, having printing units 110 which are sequentially disposed in the horizontal direction. The label printing machine serves for processing a substrate 1 in the form of a web. The substrate is unwound from a substrate roll 146 in a feed part, supply station or unwinding installation 148 of the printing machine 100 and guided along a path in a machine-conveying direction M through the printing machine 100. The printing machine 100 may have a plurality of frame modules 126. In this case, for example, three frame modules 126 are provided. In this embodiment, in each case two printing units 110, or one printing unit 110 and one processing unit, in this case a device 150 for punching the labels on the web-shaped substrate 1, are received on a frame module 126. Following the individual processing stations, there is an output part, discharge station or winding installation 152 in which finished products are wound up to form a label roll 154. The feed part 148, the frame modules 126 and the output part 152 are interconnected in a releasable and/or separable manner, thus resulting in a modular construction of the printing machine 100. In the illustration of the individual printing units 110, in this case flexographic printing units, a chamber-type doctor is shown in addition to printing plate cylinders, impression cylinders and ink applicator rollers. The printing units 110 in the printing machine 100 furthermore have various drying installations, namely UV drying installations, disposed downstream of a respective printing nip of the printing unit 110, which are assigned to the impression cylinders, in such a way that the printed substrate 1 may be dried directly on the impression cylinder. The printing units 110 also have web guide rollers 160 for guiding the web-shaped substrate 1. In the embodiment shown, the fifth printing unit 110 includes a hot-air drying installation 162. Alternatively, a UV drying installation or an IR drying installation could also be employed in this case. The punching device 150, according to the invention, which will be described in more detail below, is disposed downstream. In addition to the punching device 150, an embossing unit, for example a hot film embossing unit, may also be used. As an alternative to the illustrated flexographic printing units, offset printing units and rotary screen printing units may also be employed.

Figure 2:
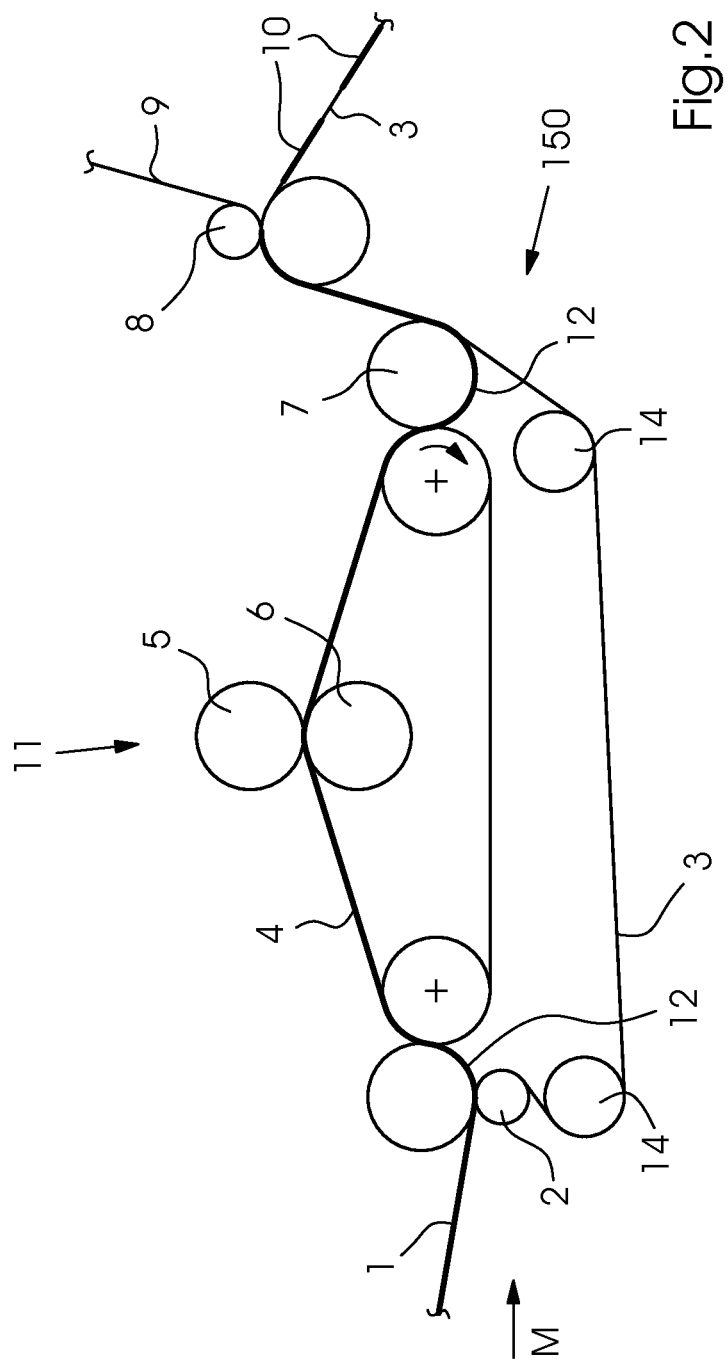
FIG. 2 is an enlarged, side-elevational view of the device for punching labels, according to the invention.

The punching device 150 is illustrated in more detail in FIG. 2. A substrate web 1 is conveyed through the punching device 150 in the machine-conveying direction M, which is also referred to as the web-conveying direction. The substrate web 1 in this case is composed of an upper layer, the label layer 12 which is typically printed, and a lower layer, the carrier layer 3. The two layers 3, 12 are interconnected by a non-illustrated adhesive layer. The substrate web 1 is separated by a delaminating roller 2 in such a manner that the label layer 12 is conveyed onward by a punching unit 11 and the carrier layer 3, by using conveying rollers 14, is diverted around the punching unit 11. The label layer 12 is transferred by the delaminating roller 2 to a counterpunching belt 4 in such a manner that the label layer, with its side provided with adhesive, adheres on the counterpunching belt 4. The counterpunching belt 4 is implemented as a revolving, endless metallic belt which may be provided with a non-stick coating on its upper side, in such a way that the label layer 12, after the punching process has been completed, can readily be peeled off again. The label layer 12 is conveyed through the punching unit 11 by the counterpunching belt 4. The punching unit 11 is implemented as a rotary punch having a punching cylinder 5 and a counter roller 6. The counter roller 6 is disposed below the counterpunching belt 4. Once the punching process has been completed, the label layer 12, by way of a laminating roller 7, is reconnected to the carrier layer 3, and the two layers 3, 12 are collectively conveyed onward. Subsequently, by using a matrix stripping roller 8, waste which is located around labels 10, a so-called matrix 9, is stripped, in such a way that only the labels 10 on the carrier layer 3 are conveyed onward.

Figure 3A:
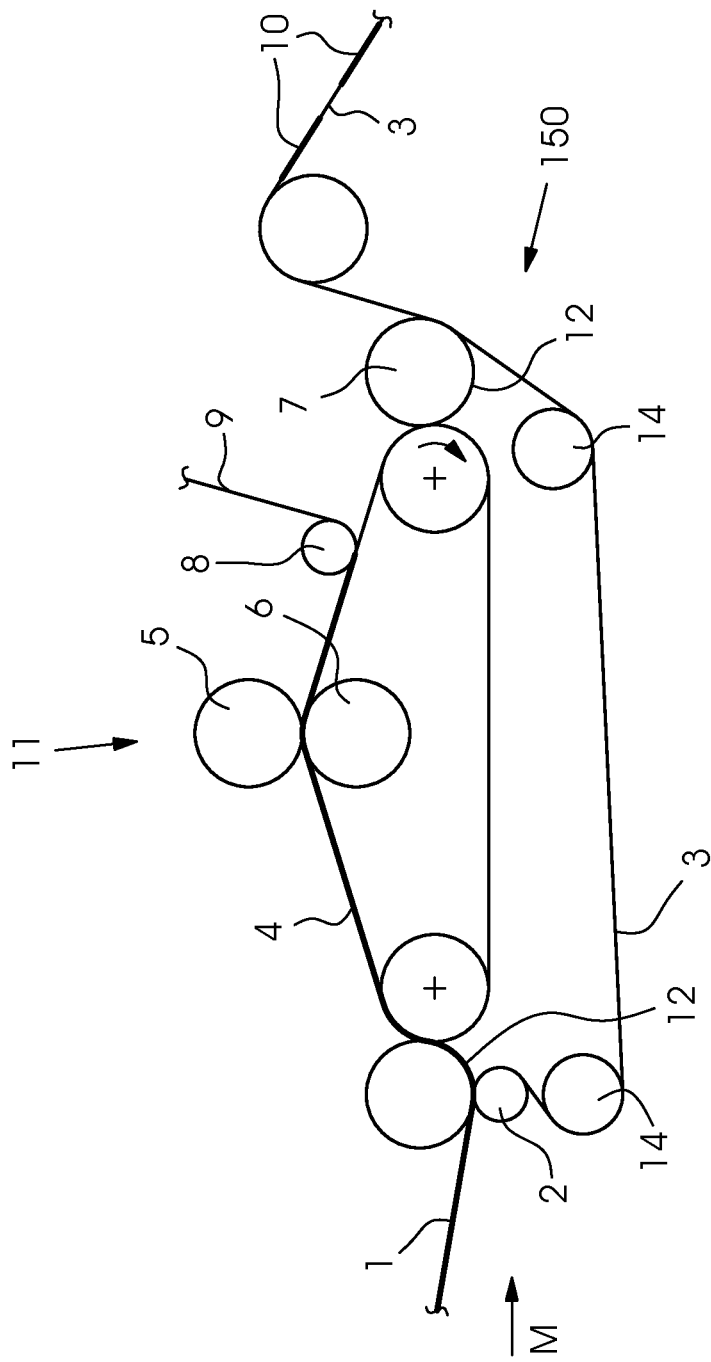
FIG. 3A is a side-elevational view of a first alternative embodiment of the device for punching labels.

In the variant of the embodiment illustrated in FIG. 3A, the matrix 9 is already stripped by the matrix stripping roller 8 immediately after the punching process, in such a way that only the labels 10 are still applied onto the carrier layer 10 by the laminating roller 7 which is implemented as a vacuum roller. The further construction of the punching device 150 corresponds to the embodiment illustrated in FIG. 2 and described above.

Figure 3B:
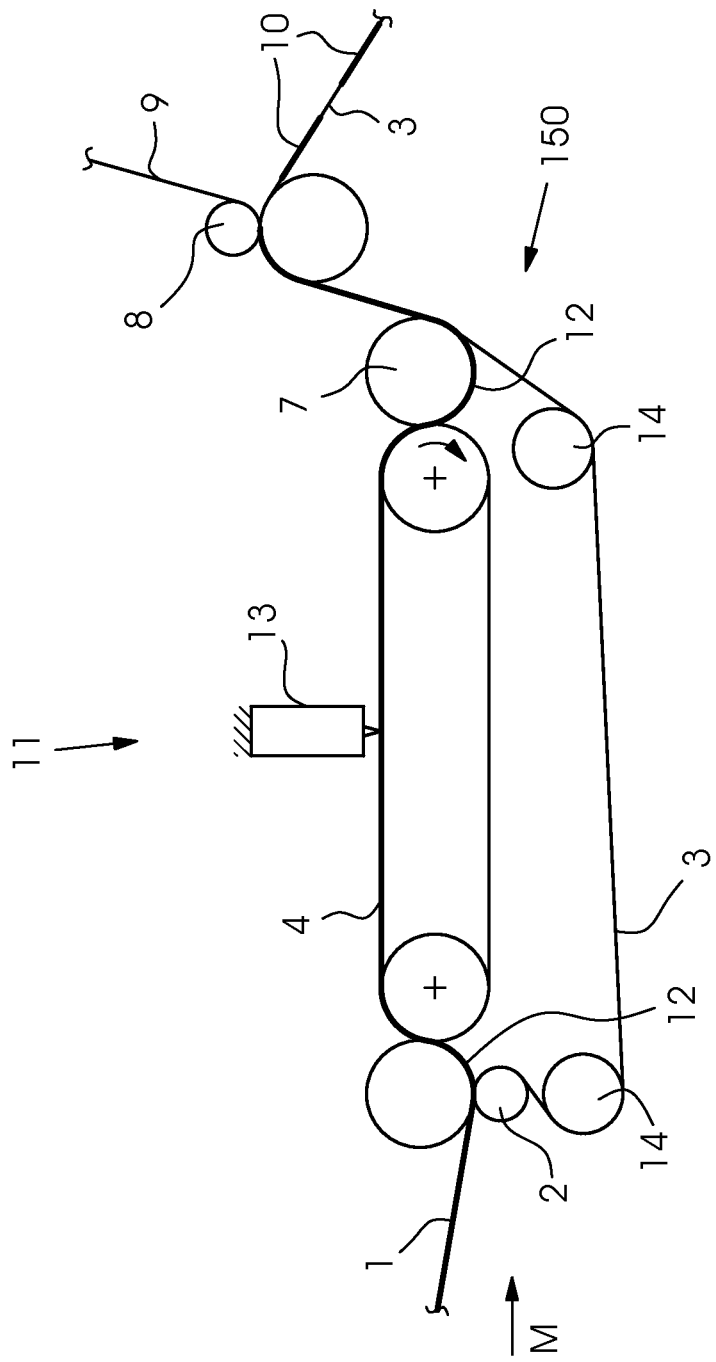
FIG. 3B is a side-elevational view of a second alternative embodiment of the device for punching labels.

According to the variant of the embodiment illustrated in FIG. 3B, the punching unit 11 has a laser punching unit 13 rather than any mechanical punching tools. The further construction of the punching device 150 corresponds to the embodiment illustrated in FIG. 2 and described above.

The invention claimed is:

1. A device for cutting labels, the device comprising:
   an unwinding installation configured to provide a substrate web having a carrier layer and a label layer with an adhesive side;
   a label cutting installation disposed downstream of said unwinding installation in a web-conveying direction, said label cutting installation including a delaminating installation configured to separate the label layer from the carrier layer, a metallic non-suction revolving countercutting belt configured to convey the label layer during a cutting operation producing cuttings and configured to be temporarily connected to the adhesive side of the label layer, and a relaminating installation configured to connect the label layer provided with the cuttings to the carrier layer; and
   a winding installation disposed downstream of said label cutting installation in said web-conveying direction and configured to receive the substrate web.

2. The label cutting device according to claim 1, wherein the substrate web is a printed substrate web.

3. The label cutting device according to claim 1, which further comprises conveying rollers disposed parallel to said cutting installation for conveying the carrier layer during the cutting operation.

4. The label cutting device according to claim 1, wherein said delaminating installation is a delaminating roller.

5. The label cutting device according to claim 1, wherein said relaminating installation is a laminating roller.

6. The label cutting device according to claim 1, wherein said delaminating installation is a delaminating roller and said relaminating installation is a laminating roller.

7. The label cutting device according to claim 1, which further comprises a cutting cylinder associated with said revolving counterpunching belt for cutting the labels from the label layer.

8. The label cutting device according to claim 7, which further comprises a counter roller disposed below said countercutting belt and opposite said cutting cylinder.

9. The label cutting device according to claim 8, wherein said counter roller has a rubber coating.

10. The label cutting device according to claim 1, which further comprises a laser cutting unit associated with said revolving countercutting belt and configured to cut the labels from the label layer.

11. The label cutting device according to claim 1, wherein said countercutting belt has an outer surface with a coating.

12. The label cutting device according to claim 11, wherein said coating is a non-stick coating.

13. The label cutting device according to claim 1, which further comprises a matrix stripping installation disposed upstream or downstream of said relaminating installation.

14. The label cutting device according to claim 13, wherein said matrix stripping installation is a matrix stripping roller.

15. The label cutting device according to claim 1, which further comprises a device associated with said revolving countercutting belt for severing, perforating or piercing the labels from the label layer.

* * * * *